Figure 1:
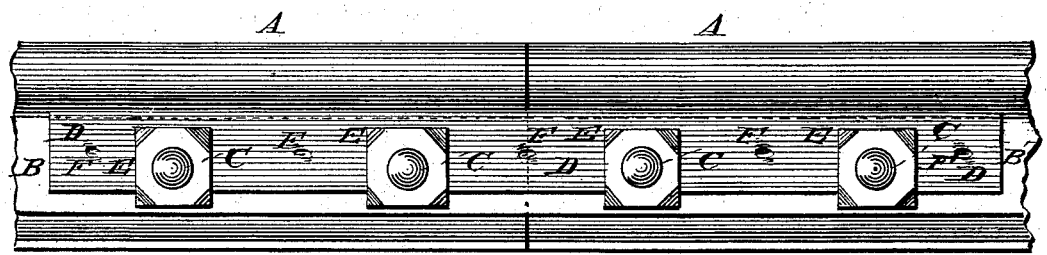

(Model.)

A. L. LINCOLN.
NUT LOCK.

No. 255,801. Patented Apr. 4, 1882.

WITNESSES
Fred. G. Dieterich.
P. C. Dieterich.

INVENTOR
A. L. Lincoln,
by C. A. Snow & Co.,
Attorneys

UNITED STATES PATENT OFFICE.

ALBERT L. LINCOLN, OF BETHEL, VERMONT.

NUT-LOCK.

SPECIFICATION forming part of Letters Patent No. 255,801, dated April 4, 1882.

Application filed July 2, 1881. (Model.)

*To all whom it may concern:*

Be it known that I, ALBERT L. LINCOLN, of Bethel, in the county of Windsor and State of Vermont, have invented certain new and useful Improvements in Nut-Locks; and I do hereby declare that the following is a full, clear, and exact description of the invention, which will enable others skilled in the art to which it appertains to make and use the same, reference being had to the accompanying drawings, which form a part of this specification.

This invention relates to an improvement in nut-locks for railway-rails, and has for its objects the prevention of the lock from rattling, and also the prevention of the nut from being turned upon the bolt by the jarring that is caused by a passing train. These objects I attain by means of the device hereinafter described, and illustrated in the drawings, in which—

Figure 2:
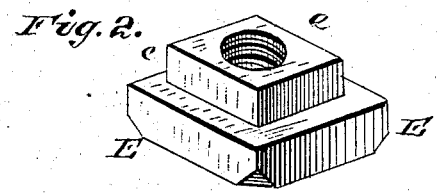
Figure 3:
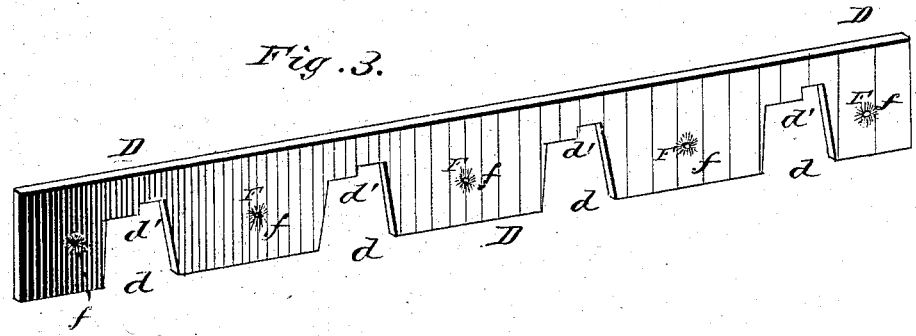

Figure 1 is a side view of the rail provided with my improved lock. Fig. 2 represents one of the nuts, and Fig. 3 illustrates the locking-plate detached.
A A indicate the meeting ends of two contiguous rails, and B the fish-plates, provided with holes, through which are passed the bolts C.

The locking-plate D is formed with a series of rectangular openings, $d$, gradually becoming larger at the bottom, with a smaller rectangular opening, $d'$, at an upper corner of each one of the openings $d$.

The nuts E are each provided with a square shoulder, $e$, which, when the nut is fitted upon the bolt, will come into one of the openings, $d$, in the locking-plate. The advantage of the opening $d'$ is that when the nut is turned back one of its corners will come into said opening, whereby the nut will not raise the locking-plate.

To prevent the locking-plate from rattling I form it with a series of indentations, F, the projected portions $f$ of the plate that are incident to said indentations resting against the fish-plate on the rail, thus accomplishing the desired results, which are the prevention of the lock from rattling or lateral vibration, and also the wedging of the lock-plate between the fish-plate and the nuts.

The above device is simple and effective, and it has been found by practical experiment to subserve the aforesaid purposes.

I am aware of patent to F. R. Gridley, No. 138,149, showing a spring-plate washer; but my invention is designed as an improvement over this patent, and has many advantages.

Having thus described my invention, I claim—

For the purpose hereinbefore set forth, the locking-plate D, having slight protuberances on one of its surfaces, formed by indenting the plate upon the opposite surface, substantially as herein specified.

In testimony that I claim the foregoing as my own I have hereto affixed my signature in presence of two witnesses.

ALBERT LEONARD LINCOLN.

Witnesses:
W. J. BROOKS,
A. A. BROOKS.